(No Model.)

C. MEINCKE.
ICE CREAM MOLD.

No. 578,889.           Patented Mar. 16, 1897.

Attest:
W. A. Adams.
H. D. Miller.

Inventor.
Carsten Meincke, per
Henry D. Miller, Atty.

THE NORRIS PETERS CO., PHOTO-LITHO., WASHINGTON, D. C.

UNITED STATES PATENT OFFICE.

CARSTEN MEINCKE, OF ELIZABETH, NEW JERSEY.

ICE-CREAM MOLD.

SPECIFICATION forming part of Letters Patent No. 578,889, dated March 16, 1897.

Application filed July 31, 1896. Serial No. 601,176. (No model.)

*To all whom it may concern:*

Be it known that I, CARSTEN MEINCKE, a citizen of the United States, residing at Elizabeth, in the county of Union and State of New Jersey, have invented certain new and useful Improvements in Ice-Cream Molds, fully described and represented in the following specification and the accompanying drawings, forming a part of the same.

This invention relates to an improvement in that class of molds for ice-cream and other frozen confections which are provided with means for softening the surface of such substance to disengage the same from the walls of the mold-cavity preparatory to turning the same out upon a plate or other receptacle. Heretofore such a device has been constructed of a hollow shell containing and surrounding the mold-cavity, said shell being filled in the space between its walls with a suitable fluid for imparting a portion of its specific heat through the intervening wall to the surface of the ice-cream contained in the mold-cavity. As the mold-cavity could not ordinarily be filled and packed in a single operation, the portion of the contents first introduced was subjected to the action of the softening liquid longer than the remaining portions, and hence the action of the device lacked uniformity.

The primary object of the present improvement is to provide an apparatus wherein the mold-cavity may be filled and packed before being subjected to the action of the softening liquid in order that the latter may act uniformly upon the entire surface of the molded ice-cream; and to this end my present invention consists, essentially, in the combination, with the hollow shell containing the mold-cavity, of a liquid-reservoir below the same and in direct communication with the interior of the hollow shell and a perforated plate or screen interposed between said reservoir and hollow shell, whereby the inversion of the mold for the discharge of the contents of the mold-cavity operates to project and distribute the liquid contained in the said reservoir upon the wall of the mold-cavity for softening the surface of the ice-cream in contact therewith.

The present invention also includes a vent-pipe leading from the bottom of the mold-cavity outward to the exterior of the mold for relieving the suction commonly produced by the removal of the molded cream from such cavity.

The invention will be understood by reference to the annexed drawings, wherein—

Figure 1:
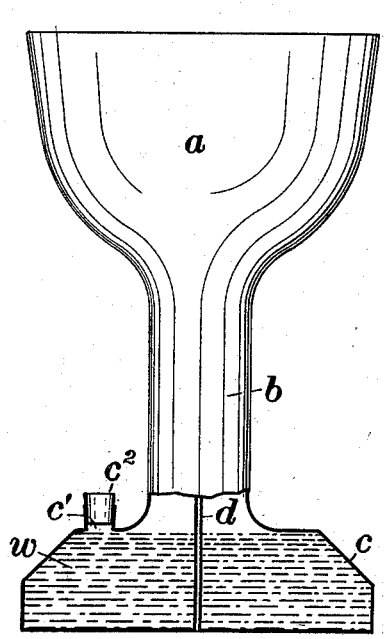
Figure 3:
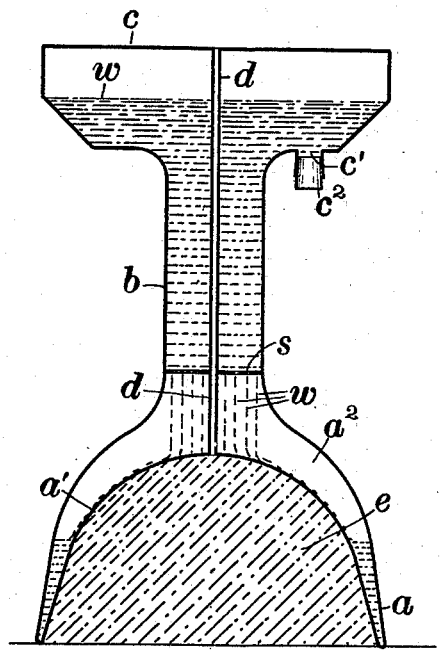
Figure 2:
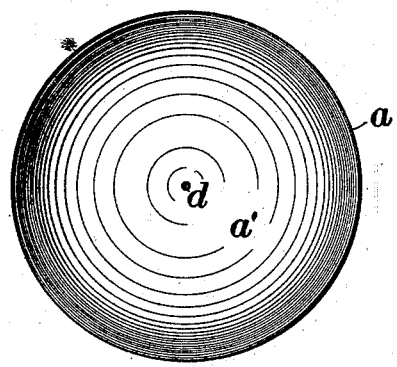
Figure 4:
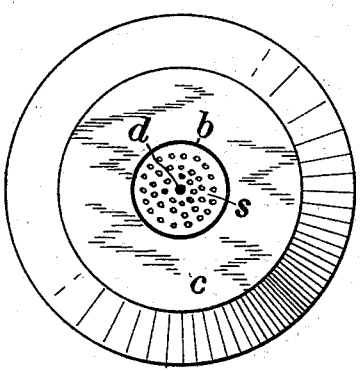

Figure 1 is an elevation, partly in section, of a mold embodying my improvement; Fig. 2, a plan of the same; Fig. 3, a sectional elevation of the device inverted to illustrate its mode of operation, and Fig. 4 a sectional plan showing the screen and parts below the same in plan view.

The hollow shell $a$ is formed of thin metal with a central mold-cavity $a'$ and intermediate space $a^2$ between its inner and outer walls. A tubular column $b$, integral with the outer wall of the part $a$, joins the latter to the base portion $c$, which is constructed as a reservoir for the softening liquid $w$, which is introduced through the aperture $c'$, having the stopper $c^2$ for closing the same.

A perforated plate or screen $s$ is inserted transversely of the tubular portion $b$ near its upper end, separating the space $a^2$, surrounding the mold-cavity, from the reservoir partially, although not cutting off the direct communication of such parts entirely. A vent-pipe $d$ is shown leading from the bottom of the mold-cavity through the lower side of the reservoir $c$.

In the use of the device the softening fluid, as water or alcohol, having been introduced into the reservoir, as indicated in Fig. 1, the mold-cavity is filled and packed with ice-cream and inverted upon a plate or other suitable receptacle, as indicated in Fig. 2. Such inversion causes the liquid to flow downward through the tubular part $b$ and to drip from the screen $s$ upon the inverted bottom of the mold-cavity wall, down which it flows, thereby covering the whole surface and giving up a portion of its specific heat to such wall in its flow. When the thin film of ice-cream in direct contact with the wall of the mold-cavity has become sufficiently softened, the mold may be withdrawn upwardly therefrom, when air is admitted to the space vacated in the bottom of the mold-cavity through the vent-pipe $d$ to supply the vacuum which would be caused therein otherwise. Thus as soon as the molded contents of the cavity $a'$ is sufficiently loosened its immediate discharge is permitted, its issue from such cavity not being retarded by a partial vacuum within the latter, so as to receive any further action of the softening fluid.

Owing to the uniformity of action of the softening liquid, it is obvious that the mold is adapted for various ornamental designs of mold-cavity, the softening being insufficient to injure any projections or uneven portions of the surface of the contents, and I do not, therefore, limit myself herein to any particular form of mold-cavity.

While the screen $s$ and vent-pipe $d$ are of some importance in the present improvement, they are not necessary parts of the apparatus, the essential feature of which is the separate liquid-reservoir in direct communication with the interior of the hollow shell containing the mold-cavity and adapted to project its contents therein when the mold is inverted.

The tubular column $b$ is provided in order to offer a convenient means of handling the device, but it may obviously be dispensed with, if preferred, the reservoir $c$ then adjoining the hollow shell $a$.

Having thus set forth the nature of the invention, what I claim herein, and desire to secure by Letters Patent, is—

1. An ice-cream mold comprising a hollow shell containing and surrounding the mold-cavity, a fluid-reservoir in communication with the interior of said hollow shell, and a perforated plate or screen interposed between said reservoir and hollow shell, as and for the purpose set forth.

2. An ice-cream mold comprising a hollow shell containing and surrounding the mold-cavity, a fluid-reservoir in communication with the interior of said hollow shell, and a vent-pipe connecting the bottom of the mold-cavity with the exterior of the mold, as and for the purpose set forth.

In testimony whereof I have hereunto set my hand in the presence of two subscribing witnesses.

CARSTEN MEINCKE.

Witnesses:
 ELLA PIKE,
 HENRY J. MILLER.